United States Patent [19]
Horie et al.

[11] Patent Number: 6,126,515
[45] Date of Patent: Oct. 3, 2000

[54] LIQUID SLURRY CONTAINING POLYHEDRAL MONOCRYSTALLINE ALUMINA

[75] Inventors: Yuji Horie; Jun Watanabe, both of Tokyo, Japan

[73] Assignee: Nihon Micro Coating Co., Ltd., Tokyo, Japan

[21] Appl. No.: 09/461,269

[22] Filed: Dec. 15, 1999

[51] Int. Cl.[7] .................................. B24B 1/00; B24C 1/00

[52] U.S. Cl. .................................. 451/36; 451/57; 451/41

[58] Field of Search .................................. 451/36, 28, 57, 451/60, 41, 59, 304, 307, 302, 299; 216/89; 438/693; 51/309

[56] References Cited

U.S. PATENT DOCUMENTS

| 5,209,027 | 5/1993 | Ishida et al. | 451/36 |
| 5,586,926 | 12/1996 | Wedell et al. | 451/36 |
| 5,702,291 | 12/1997 | Isobe | 451/60 |
| 5,899,794 | 5/1999 | Shige et al. | 451/36 |

*Primary Examiner*—Derris H. Banks
*Attorney, Agent, or Firm*—Majestic, Parsons, Siebert & Hsue P.C.

[57] ABSTRACT

A liquid slurry containing spherical abrading particles of polyhedral monocrystalline alumina is supplied onto the target surface of a magnetic hard disk substrate to be textured while a polishing tape is pressed onto the target surface and the disk substrate is concurrently rotated. Because the contacting surfaces of these particles are spherical and have no sharp edges, they do not scratch the target surface or create grooves which are undesirably too deep.

6 Claims, 8 Drawing Sheets

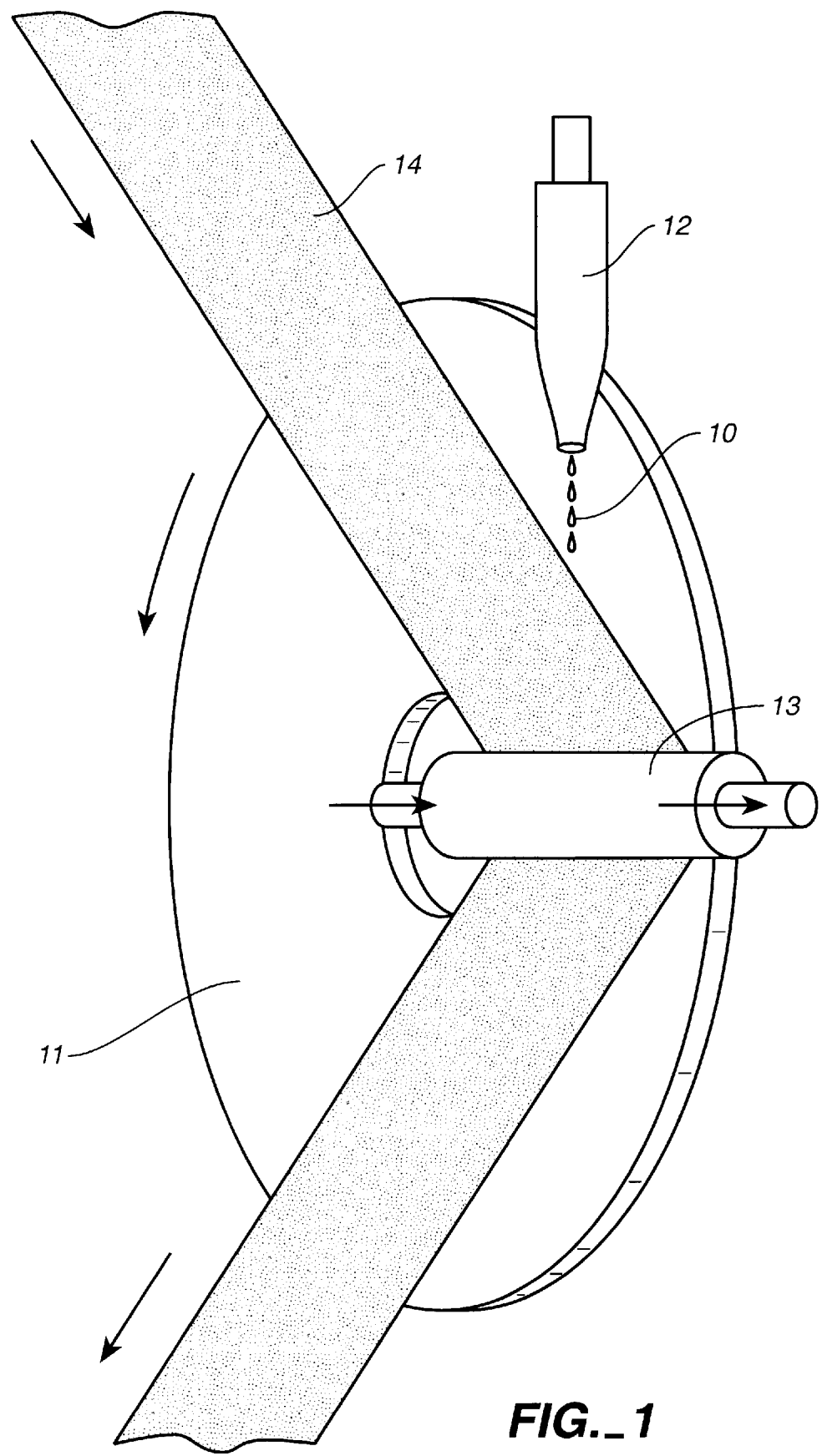
FIG._1

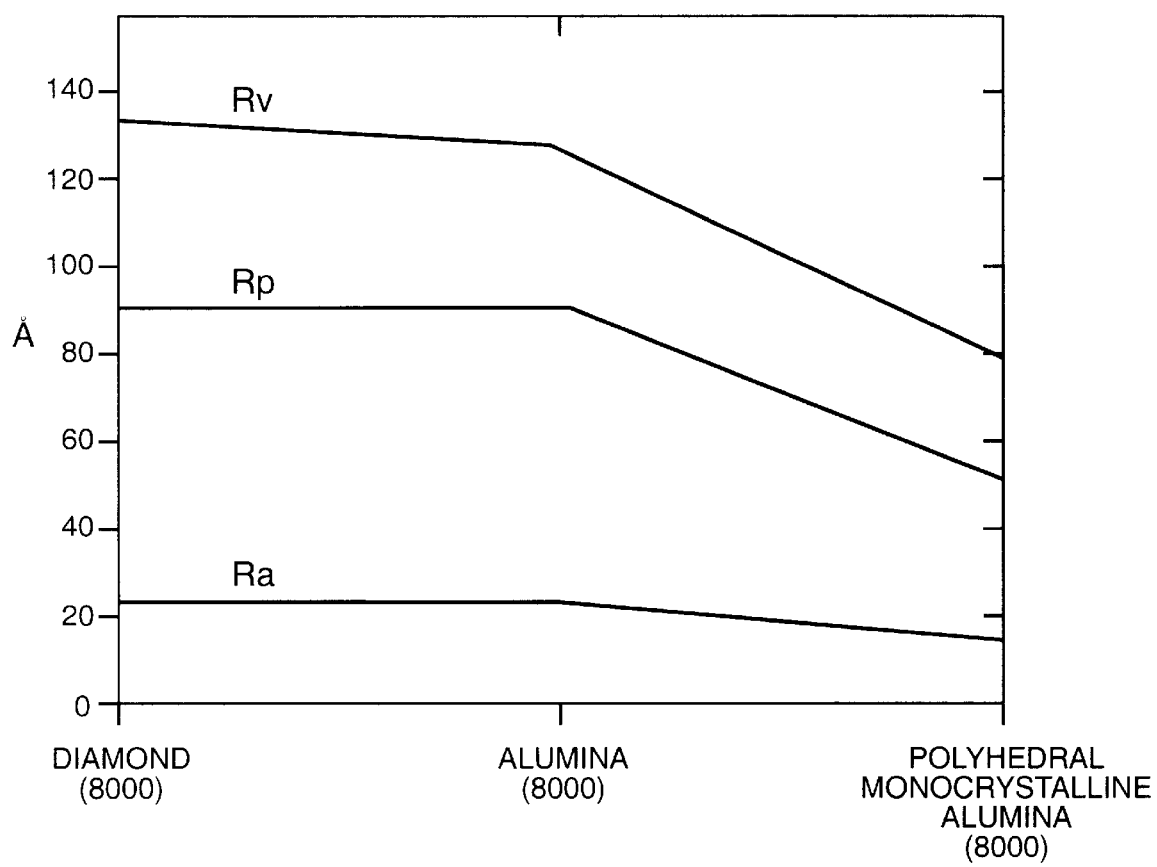
FIG._2

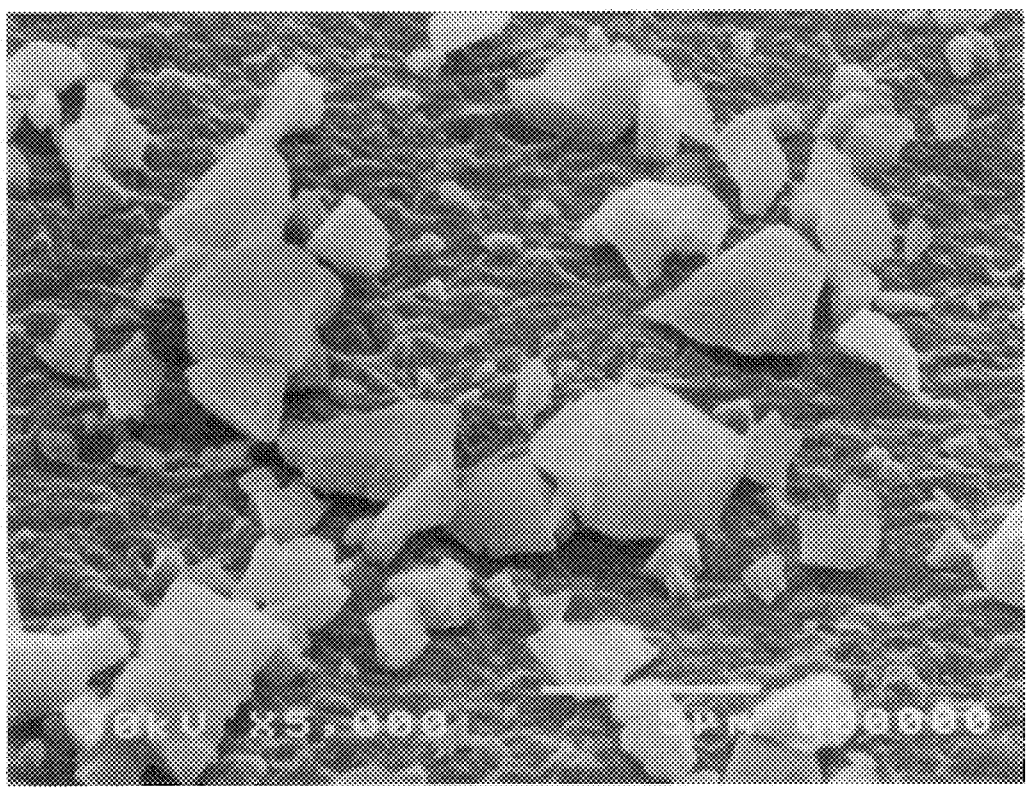
FIG._3a
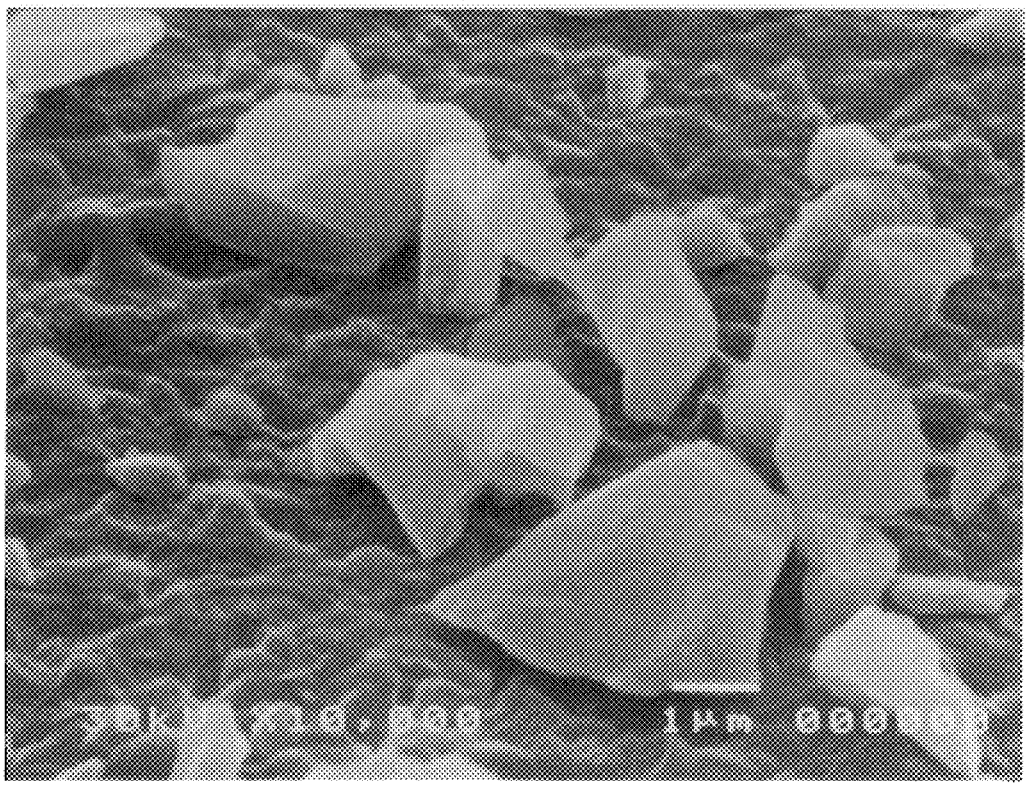
FIG._3b

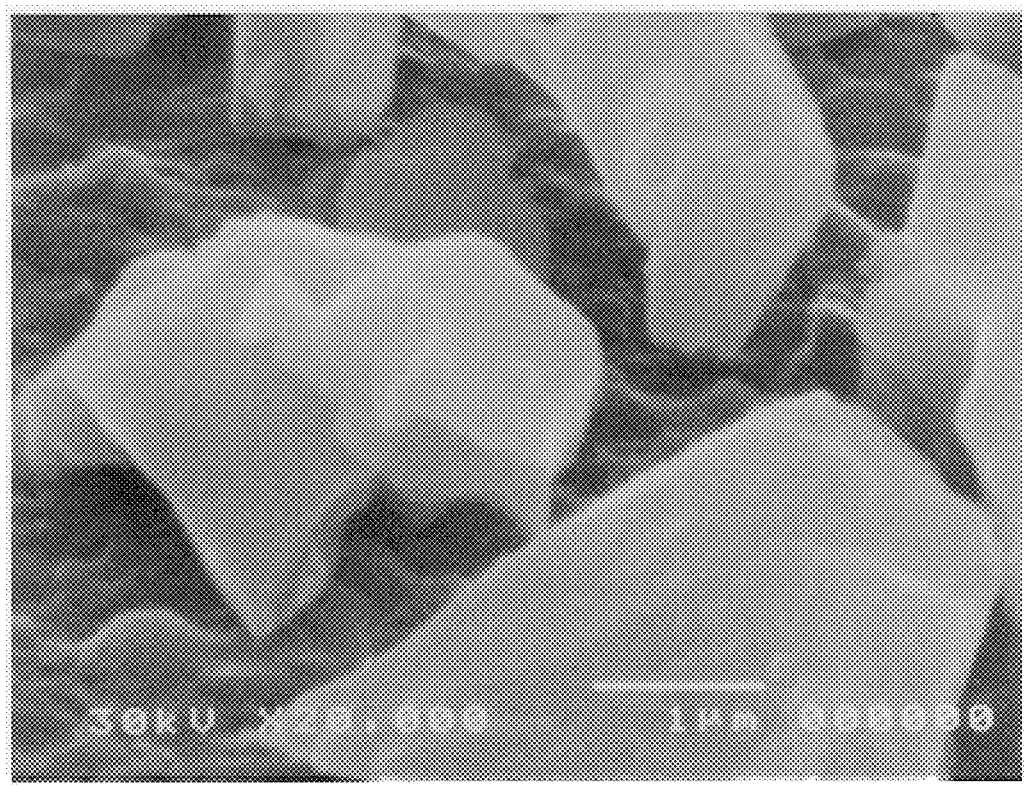
FIG._3c
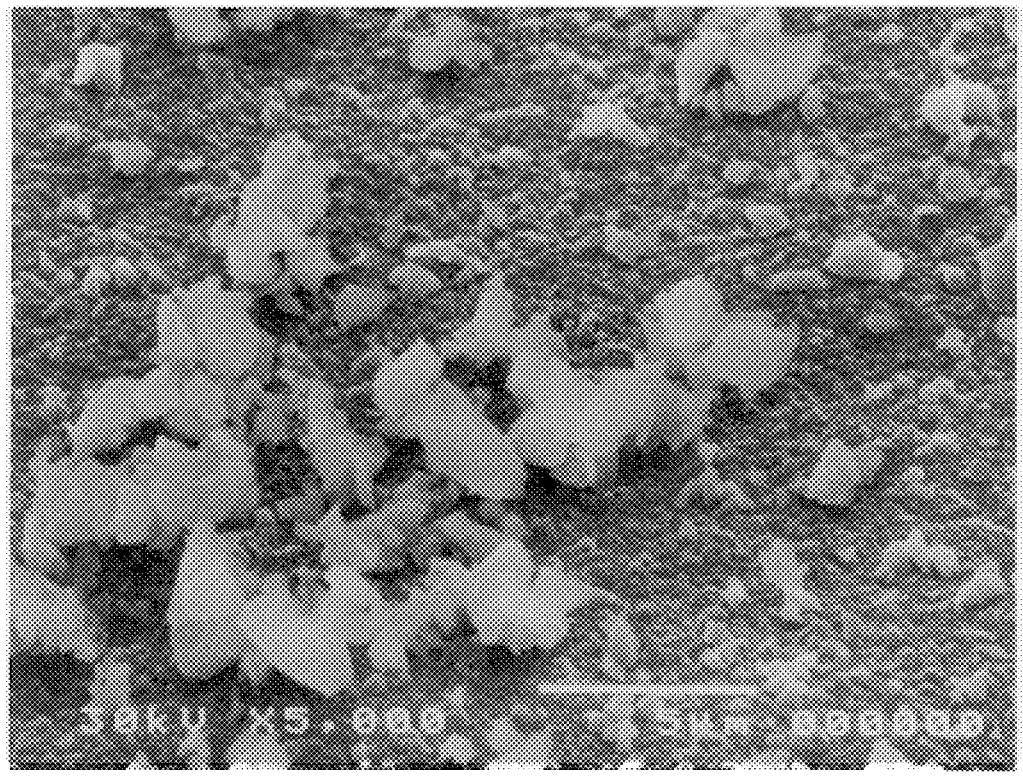
FIG._4a

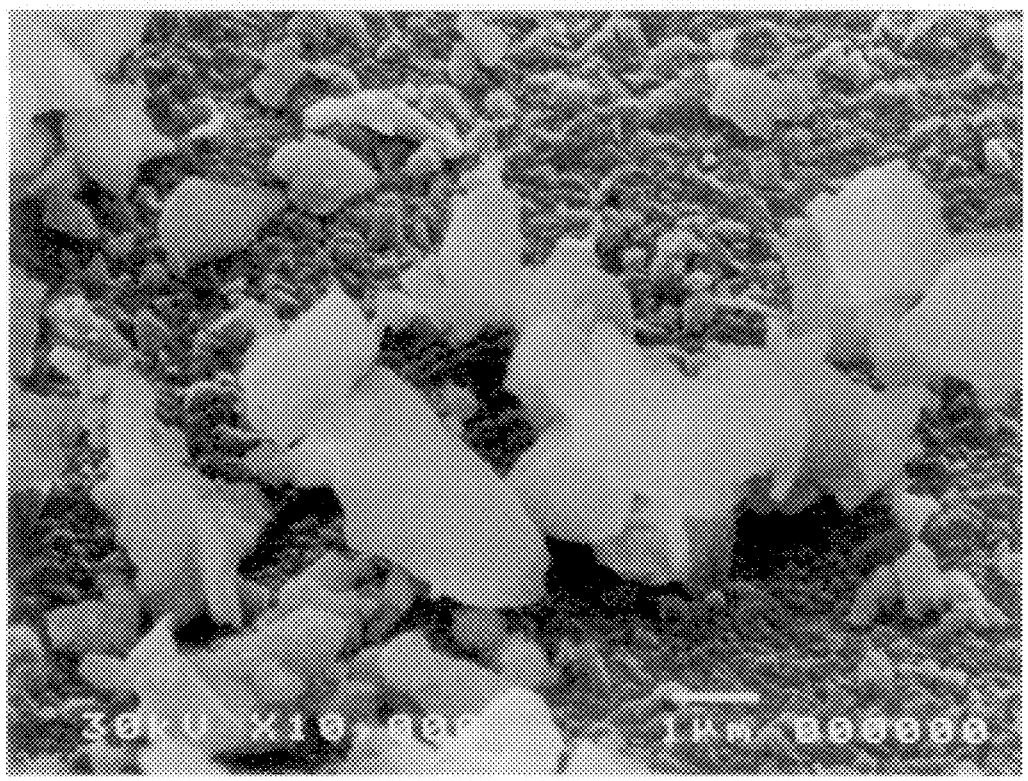
FIG._4b
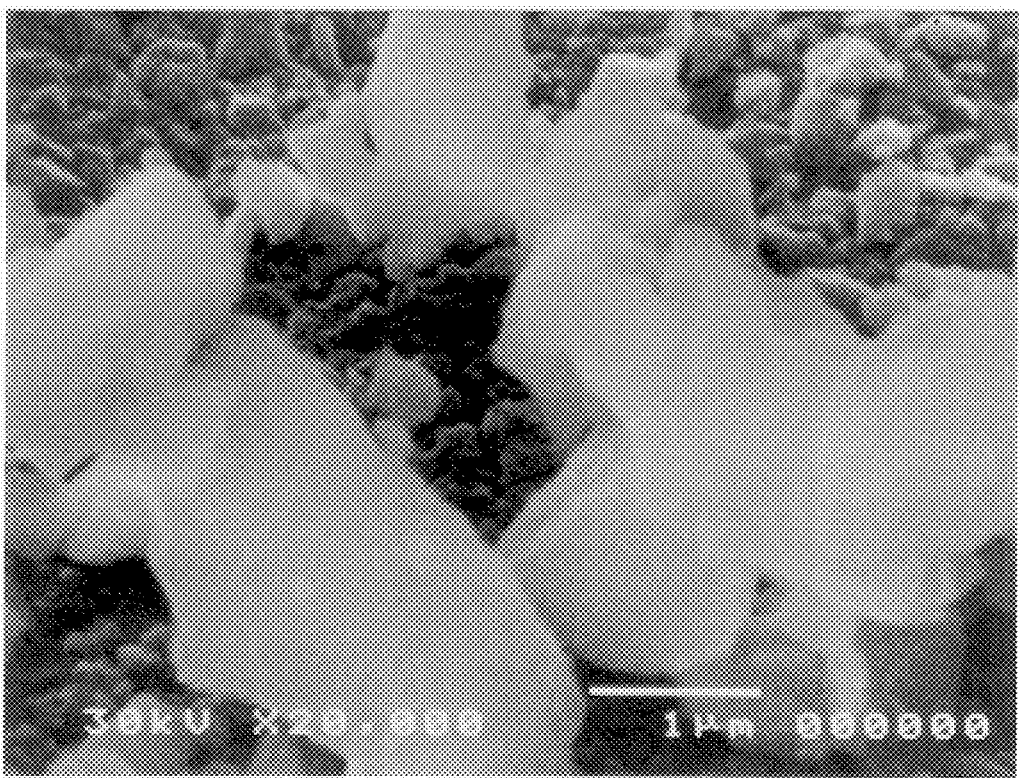
FIG._4c

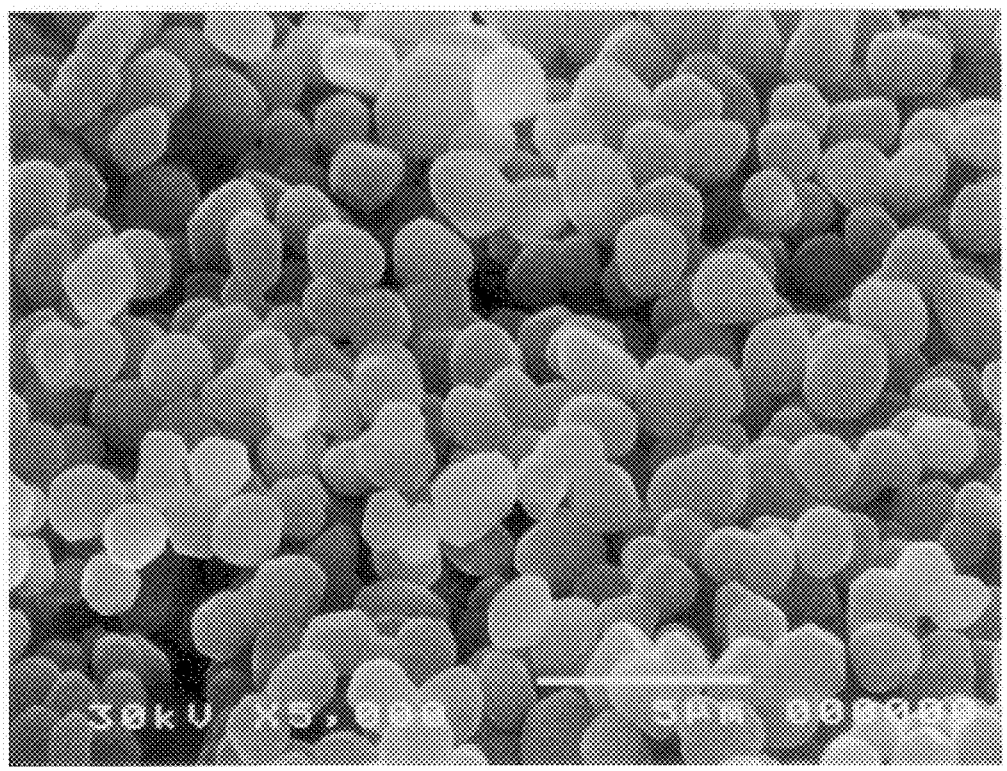
FIG._5a
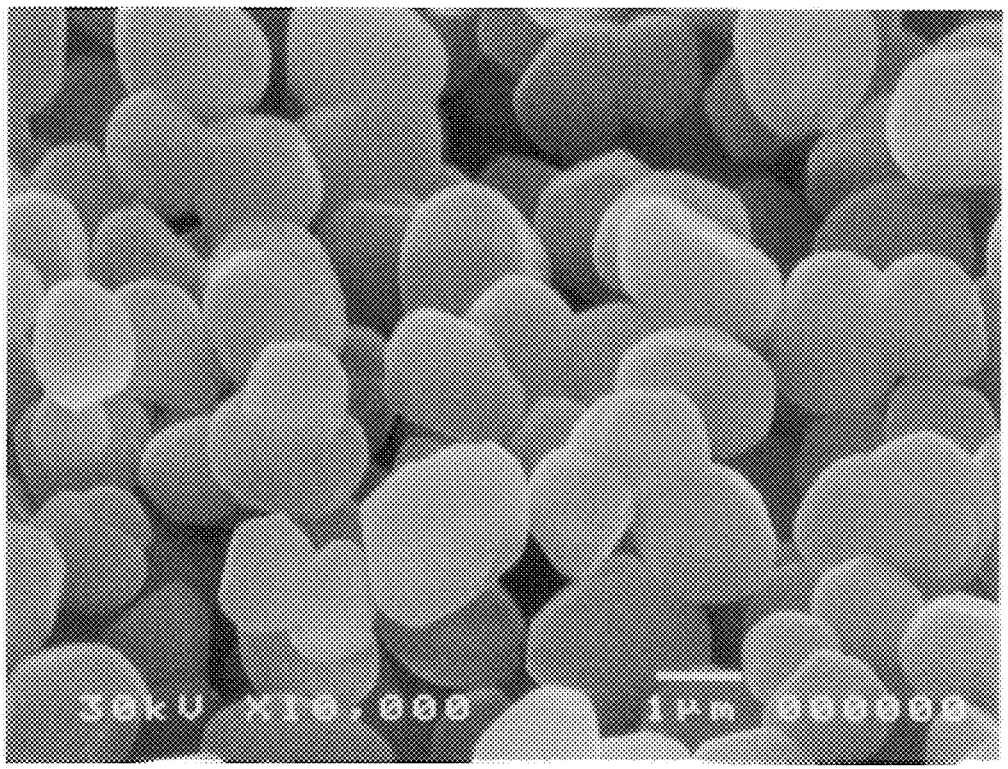
FIG._5b

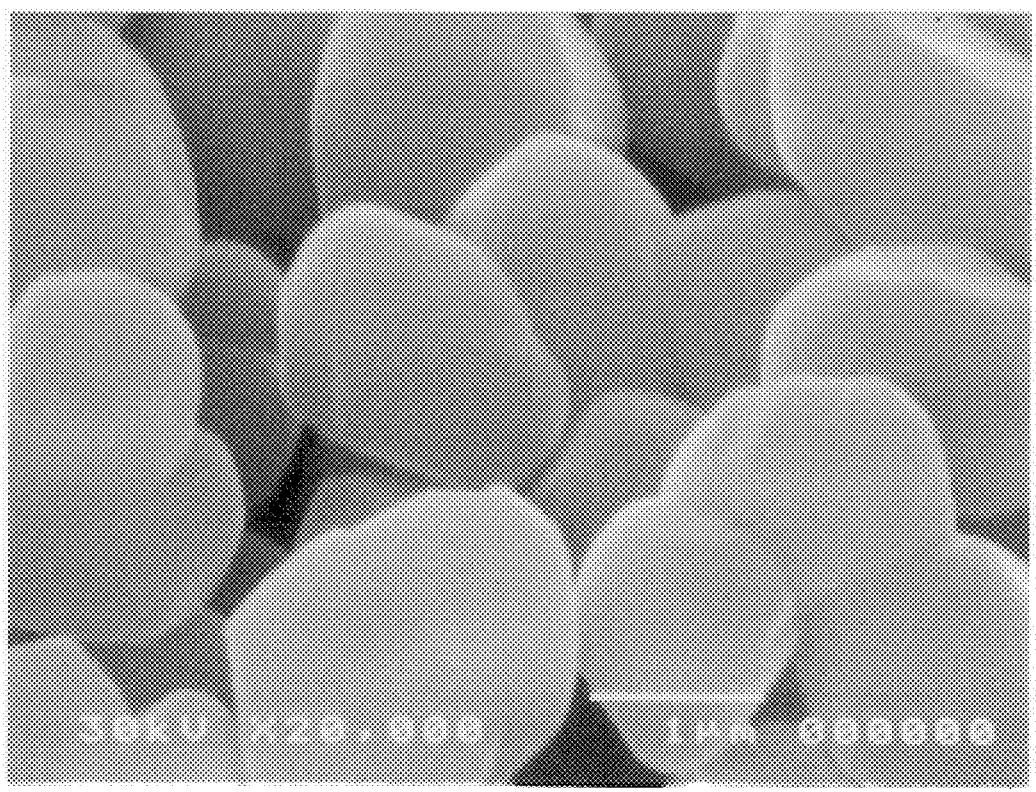
FIG._5c
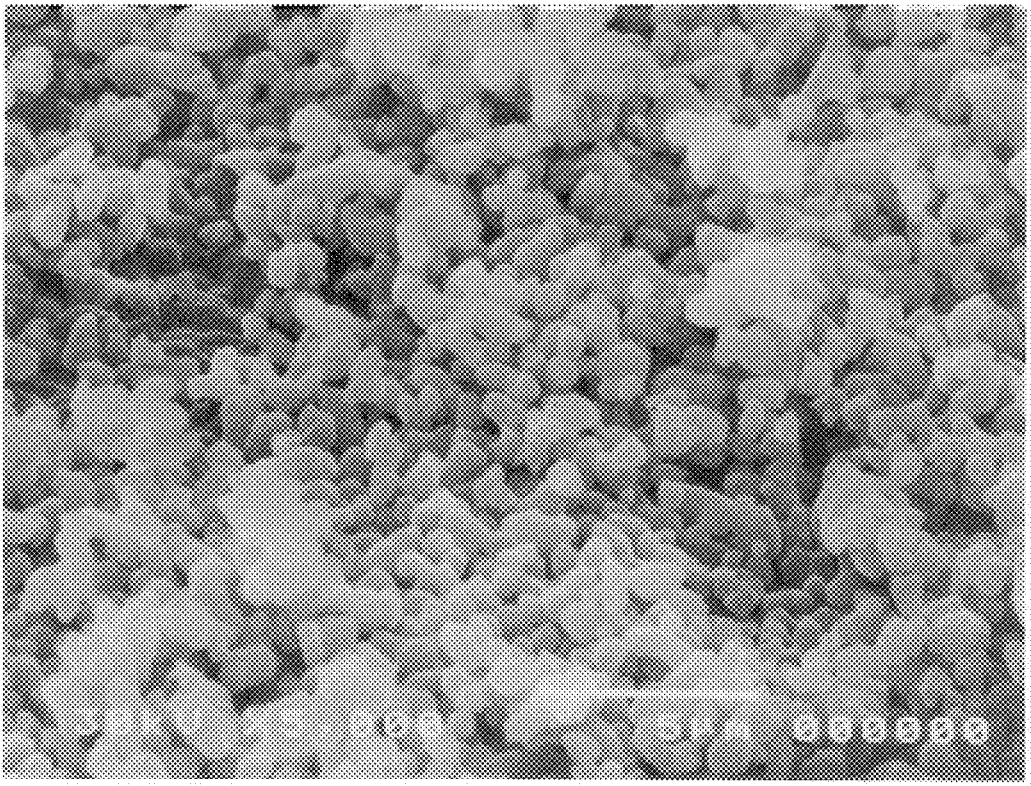
FIG._6a

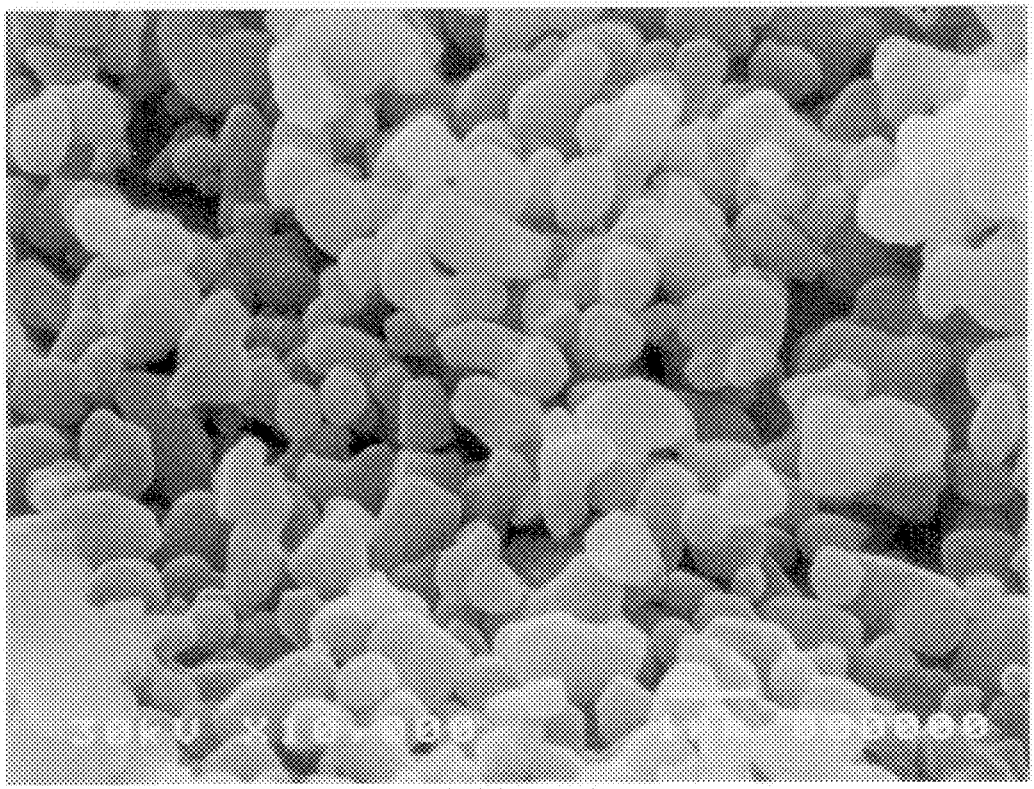
*FIG._6b*
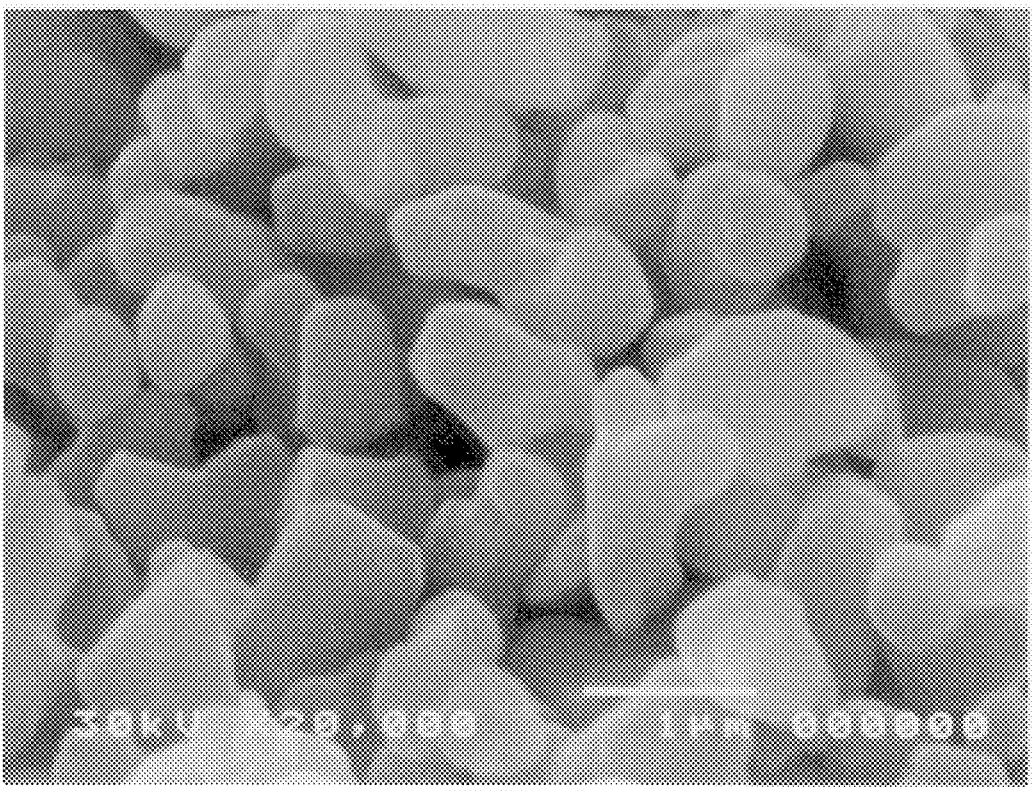
*FIG._6c*

LIQUID SLURRY CONTAINING POLYHEDRAL MONOCRYSTALLINE ALUMINA

BACKGROUND OF THE INVENTION

This invention relates to liquid slurries for use in a high-precision finishing process on the surface of a magnetic hard disk substrate and, more particularly, to liquid slurries containing polyhedral monocrystalline alumina such that fine central line average surface roughness (Ra) and a high polishing capability can be obtained. This invention also relates to a method of producing a magnetic hard disk substrate with its surface textured by using such a liquid slurry.

With the recent development in the so-called high-tech industries centered around the electronics industries, the memory capacity of magnetic disks is becoming higher and there is an increasing demand for high precision in the finishing of disk substrate surfaces. If a magnetic head is stopped on a magnetic disk thus structured, however, the magnetic head may be adsorbed to the magnetic disk due to the water component or a lubricant adsorbed to the disk surface. In order to prevent such occurrence of adsorption, it has been known to carry out a texturing process to form fine concentric protrusions and indentations on the surface of magnetic hard disk substrates in the circumferential direction of the substrate. The texturing process is usually carried out by using a liquid slurry obtained by dispersing abrading particles, say, of white molten alumina in a liquid, or a polishing tape obtained by coating a base material, say, of polyester with abrading particles for grinding.

Prior art abrading particles are obtained by pulverizing a base substance. Prior art alumina particles for grinding are obtained, for example, by pulverizing electrically molten alumina. When pulverizing a base abrading material, however, it is difficult to control the size and shape of the fragments or the manner in which the splitting occurs. Abrading particles obtained simply by pulverizing are not uniform and there are big variations in their sizes and shapes. If a texturing process is carried out by using a liquid slurry containing large abrading particles, these large particles tend to abrade the substrate surface excessively deeply, resulting in protrusions.

Another problem is that abrading particles thus obtained have very sharp edges at irregularly formed corners. If the texturing is carried out with abrading particles with sharp edges, the substrate surface is also scratched more deeply than desired or protrusions are formed. Moreover, such sharp edges of the abrading particles are likely to break off during the texturing operation. The portions that have broken off may be stuck to the substrate surface or displaced so as to form grooves where they are not intended. There are even situations where the alumina particles themselves become buried into the substrate surface to produce protrusions.

As the recording density on the magnetic disk is increased, the height of the magnetic head over the magnetic disk must be reduced in order to improve the signal sensitivity at the time of recording and reproduction. If there are protrusions sufficiently high on the substrate surface, however, the magnetic head may collide with such a protrusion (an event referred to as the "head hit"). If the texturing is carried out intentionally insufficiently in order to prevent the generation of such tall protrusions, however, the magnetic disk will end up being too smooth on the surface and the adsorption to the head will result, as described above.

It is necessary to use smaller abrading particles for reducing the center line average roughness. But a sufficiently large polishing capability is difficult to obtain with abrading particles with a small average diameter. Two steps of polishing may therefore be necessary, the first with larger abrading particles for rough polishing and the second with smaller abrading particles for fine polishing.

SUMMARY OF THE INVENTION

It is therefore an object of this invention to provide a liquid slurry containing abrading particles with which minute center line average roughness can be obtained without giving rise to the problems such as the head hit.

A liquid slurry embodying this invention, with which the above and other objects can be accomplished, is characterized as containing spherical abrading particles of polyhedral monocrystalline alumina. Because the contacting surfaces of these particles are spherical and have no sharp edges, they do not scratch the target surface to be textured or create grooves which are undesirably too deep. Such a liquid slurry is supplied onto the target surface of a magnetic hard disk substrate to be textured while a polishing tape is pressed onto the target surface and the disk substrate is concurrently rotated.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a sketch of a texturing process with the use of a liquid slurry embodying this invention;

FIG. 2 is a graphical representation of the results of test and comparison experiments in which substrate surfaces were textured by using liquid slurries both according to and not according to this invention;

FIGS. 3(a), 3(b) and 3(c) are electron microscope photographs (with magnification respectively at 5000 times, 10000 times and 20000 times) of abrading particles with granularity 6000 and average particle diameter 2 μm, obtained simply by pulverizing white molten alumina;

FIGS. 4(a), 4(b) and 4(c) are electron microscope photographs (with magnification respectively at 5000 times, 10000 times and 20000 times) of abrading particles with granularity 8000 and average particle diameter 1 μm, obtained simply by pulverizing white molten alumina;

FIGS. 5(a), 5(b) and 5(c) are electron microscope photographs (with magnification respectively at 5000 times, 10000 times and 20000 times) of abrading particles of polyhedral monocrystalline alumina with granularity 6000 and average particle diameter 2 μm; and FIGS. 6(a), 6(b) and 6(c) are electron microscope photographs (with magnification respectively at 5000 times, 10000 times and 20000 times) of abrading particles of polyhedral monocrystalline alumina with granularity 8000 and average particle diameter 1 μm.

DETAILED DESCRIPTION OF THE INVENTION

A liquid slurry embodying this invention is characterized as containing spherical abrading particles of polyhedral monocrystalline alumina such as SHOLITE® and ALFIT® (trademarks owned by Showa Denko Co., Ltd. of Japan). The average particle diameter of this polyhedral monocrystalline alumina is 0.1–5 μm, or preferably 0.1–3 μm and their concentration in the slurry is 0.1–5 weight %, or preferably 0.1–2 weight %. The slurry itself is an aqueous solution preferably containing a surfactant in an amount of 1–20 weight %. The surfactant is preferable because it functions to disperse the abrading particles uniformly and to prevent them from precipitating. Any known kind of surfactant may be used, such as polyalkylene glycol. Thus a liquid slurry according to this invention can be made by dispersing polyhedral monocrystalline alumina particles in a surfactant and stirring the mixture.

As shown in FIG. 1, a liquid slurry 10 may be dropped from a nozzle 12 onto the target surface of a magnetic hard disk substrate 11 to be textured, while a polishing tape 14 is applied against the target surface of the disk substrate 11 through a rubber roller 13 and the tape 14 is caused to run in a reverse direction with respect to the direction of rotation of the disk substrate 11. If a liquid slurry containing polyhedral monocrystalline alumina according to this invention is used, it is possible to obtain not only a result of texturing obtainable by using uniform abrading particles but also a finer center line average surface roughness than by a conventional texturing process. Since there are not sharply pointed parts, furthermore, the substrate surface is not ground too deeply and no abnormally high protrusions are formed by the abrading particles. No event of head hit will be likely to be encountered. Another advantage of this invention is that a fine center line average roughness can be obtained even if abrading particles with a high grounding capability are used. Thus, since rough grinding and fine finishing can be effected simultaneously, the process can be carried out more efficiently. Still another advantage is that the liquid slurry of this invention can be washed away easily with water, like prior art liquid slurries, and hence the post-grinding routine can be carried out without any difficulty.

For ascertaining the merits of the present invention, three kinds of liquid slurries were prepared, one containing conventional diamond particles, another containing conventional pulverized alumina and the third containing polyhedral monocrystalline alumina embodying this invention. The granularity was 8000 and the average particle diameter was about 1 μm for each. They were each used for texturing as shown in FIG. 1, while dropping a liquid slurry 10 obtained by mixing the abrading particles with a water-soluble liquid containing polyalkylene glycol and aliphatic ester as surfactant (each slurry containing the corresponding abrading particles in an amount of 1 weight % and the surfactant in an amount of 5 weight %), pressing a polishing tape 14 through a rubber roller 13 on the surface of a magnetic hard disk substrate 11 with a force of 1–1.2 kg, rotating the disk substrate 11 and running the tape 14 in a reverse direction. Each texturing process took 15 seconds and the results were compared regarding the center line average surface roughness (Ra), center line peak height (Rp) and the center line valley depth (Rv), as measured by a roughness-measuring device with a probe (Model P-1 produced by Tencol, Inc.). The results are shown in Table 1 below and graphically in FIG. 2. It can be seen that the values of Ra, Rp and Rv are all much smaller if a liquid slurry according to this invention is used. The number of visually observed unwanted scratches was also fewer according to the present invention.

TABLE 1

| Abrading Particles (Granularity) | Ra | Rp | Rv | Number of scratches |
|---|---|---|---|---|
| Diamond (8000) | 22Å | 90Å | 133Å | 10 |
| Pulverized Alumina (8000) | 22Å | 90Å | 127Å | 8 |
| Polyhedral Monocrystalline Alumina (8000) | 13Å | 51Å | 78Å | 3 |

FIGS. 3(a), 3(b) and 3(c) are electron microscope photographs (with magnification respectively at 5000 times, 10000 times and 20000 times) of abrading particles with granularity 6000 and average particle diameter 2 μm, obtained simply by pulverizing white molten alumina (WA). FIGS. 4(a), 4(b) and 4(c) are electron microscope photographs (with magnification respectively at 5000 times, 10000 times and 20000 times) of abrading particles with granularity 8000 and average particle diameter 1 μm, obtained simply by pulverizing white molten alumina (WA). These photographs clearly show that the pulverized particles are not irregular in shapes and sizes and have sharp edges.

FIGS. 5(a), 5(b) and 5(c) are electron microscope photographs (with magnification respectively at 5000 times, 10000 times and 20000 times) of abrading particles of polyhedral monocrystalline alumina with granularity 6000 and average particle diameter 2 μm. FIGS. 6(a), 6(b) and 6(c) are electron microscope photographs (with magnification respectively at 5000 times, 10000 times and 20000 times) of abrading particles of polyhedral monocrystalline alumina with granularity 8000 and average particle diameter 1 μm. These photographs clearly show that polyhedral monocrystalline alumina particles according to this invention are uniform both in sizes and shapes.

What is claimed is:

1. A liquid slurry for use in a texturing process, said liquid slurry comprising a liquid solution and spherical abrading particles of polyhedral monocrystalline alumina.

2. The liquid slurry of claim 1 wherein said spherical particles of polyhedral monocrystalline alumina have an average diameter of 0.1–5 μm.

3. The liquid slurry of claim 1 containing said spherical particles of polyhedral monocrystalline alumina in an amount of 0.1–5 weight %.

4. A method of producing a magnetic hard disk substrate with a textured surface, said method comprising the steps of:
   applying a liquid slurry on a target surface of said magnetic hard disk substrate, said liquid slurry comprising a liquid solution and spherical abrading particles of polyhedral monocrystalline alumina;
   pressing a polishing tape on said target surface; and
   concurrently causing said magnetic hard disk substrate to rotate.

5. The method of claim 4 wherein said spherical particles of polyhedral monocrystalline alumina have an average diameter of 0.1–5 μm.

6. The method of claim 4 wherein said liquid slurry contains said spherical particles of polyhedral monocrystalline alumina in an amount of 0.1–5 weight %.

* * * * *